Patented June 24, 1941

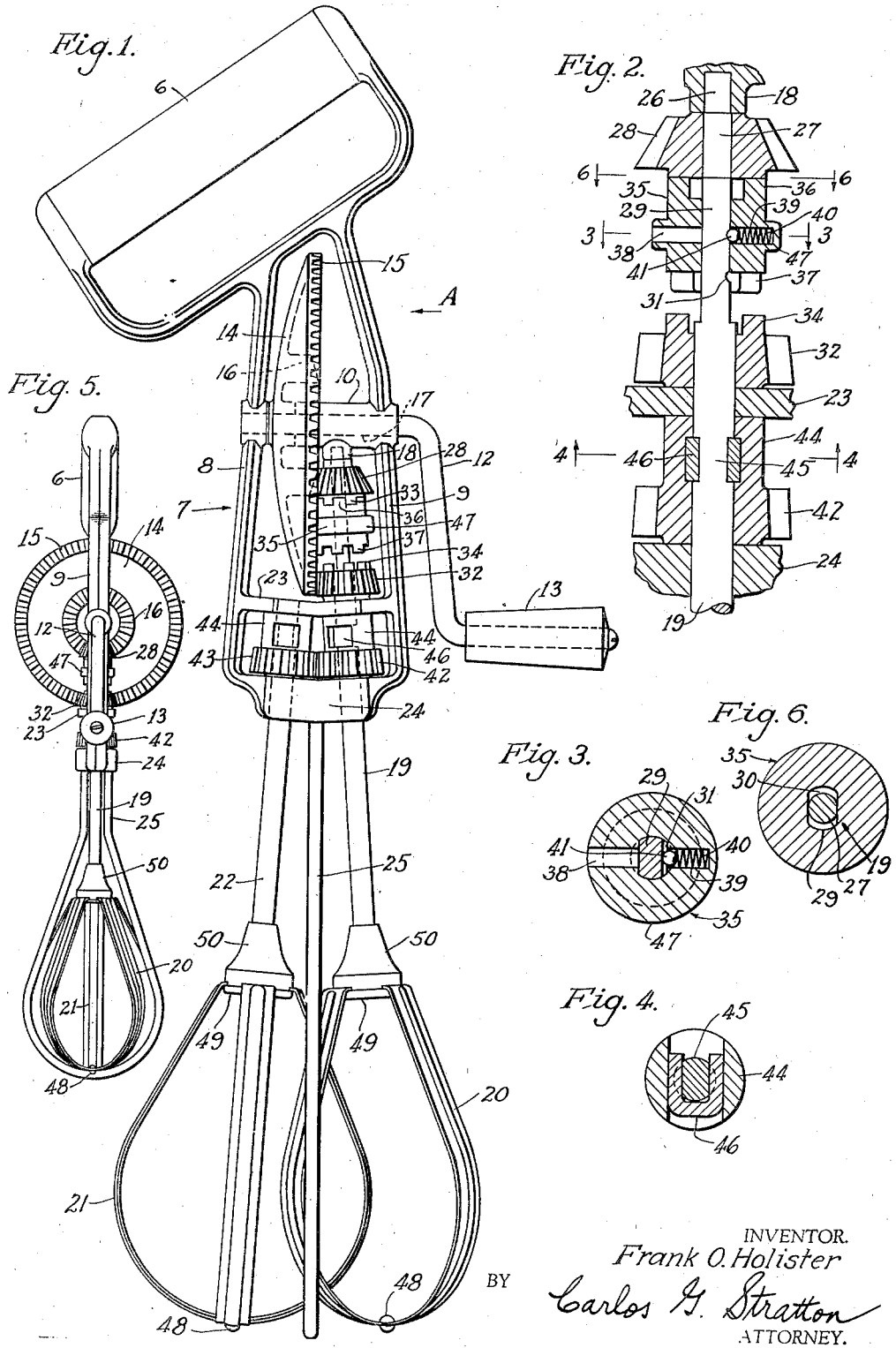

2,246,517

UNITED STATES PATENT OFFICE 2,246,517

BEATER

Frank O. Holister, Los Angeles, Calif.

Application March 30, 1939, Serial No. 264,884

1 Claim. (Cl. 74—370)

My invention relates to a household beater and more particularly to a beater having two speeds, whereby more or less viscous mixtures, fluids or pastes can be easily and properly mixed or beaten.

An object of the invention is to provide a simple but practical clutch mechanism that may be easily shifted, to change the mechanism from one speed to another.

Another object is to provide simple and practical means for assembling the various parts of such a beater.

The invention also comprises novel details of construction and novel combinations and arrangements of parts, which will more fully appear in the course of the following description.

In the drawing, like reference characters designate similar parts in the several views.

Figure 1 is an elevation of a beater embodying the present invention.

Figure 2 is an enlarged, broken longitudinal section of operating mechanism comprised in the invention.

Figure 3 is a section taken on the line 3—3 of Figure 2.

Figure 4 is a section taken on the line 4—4 of Figure 2.

Figure 5 is a reduced elevation looking in the direction of the arrow A of Figure 1.

Figure 6 is a cross-section taken on the line 6—6 of Figure 2.

Referring more in detail to the drawing, the reference numeral 6 designates a handle arranged at an acute angle to the framework 7 of the beater. Side members 8 and 9 of the frame are convergingly arranged with a bearing 10 disposed therebetween. A crank 12, has a shaft 17 that is journaled in the bearing 10. A handle 13 is arranged on the outer end of the crank.

A composite gear 14 comprises an outer and larger bevel gear 15 and an inner and smaller bevel gear 16. The composite gear 14 is keyed on the shaft 17.

A socket bearing 18 is integrally mounted on the underside of the bearing 10 to receive an end of shaft 19 of a beater member 20. The other beater member 21 is mounted on a shaft 22. The shafts 19 and 22 are journaled in a crosspiece 23 between the side members 8 and 9 of the frame and in an end member 24 of the frame 7. A guard member 25 is fixed in the end member 24 and loops around the overlapping portions of the beaters 20 and 21.

The end of the shaft 19 is reduced in diameter and said reduced end, shown at 26, rotates in the bearing 18. The next portion 27 of the shaft 19 is circular in cross-section and permits the free rotation thereon of the bevel gear 28. The next portion 29 of the shaft 19 is oblong in cross-section, with rounded ends. The relative sizes of the portions 27 and 29 of the shaft 19 are shown in Figure 6. The bevel gear 28 rotates on the shoulders 30 provided by the shaft portion 29.

The shaft portion 29 has two transverse grooves 31. A bevel gear 32 is freely rotatable upon the circular circumference of the shaft 19. The gear 32 rotates upon the crosspiece 23. The gears 28 and 32 have oppositely disposed crowned gears 33 and 34 respectively.

Slidable on the shaft portion 29 is a clutch member 35 which has crown gears 36 and 37 at opposite ends, which respectively mesh with crown gears 33 or 34. The clutch member 35 has a bore that is irregularly shaped in conformity with a cross-section of the shaft portion 29, whereby the clutch 35 is compelled to rotate with the shaft 19 at all times. A transverse bore 38 in the clutch 35 extends more than half way through the clutch in order to provide a socket 39 in which to receive a coil spring 40. A ball 41 is disposed to be urged by the spring 40 into one or the other of the grooves 31. The grooves 31 are disposed in such positions that the clutch 35 is held in mesh with the crown gear 36 on the gear 28 or in mesh with the crown gear 34 on the gear 32, when the ball 41 is in one or the other of the grooves respectively.

Between the crosspiece 23 and the end member 24 are meshing pinions 42 and 43 mounted respectively on the shafts 19 and 22. The pinions 42 and 43 have shanks 44 that are apertured from side to side, as shown in Figure 4. The shaft portion 45 within the shank 44 has flattened sides, to receive a U-shaped pin 46 that is driven in place, to key the gears 42 and 43 on their respective shafts. A rib 47 provides manual means for manipulating the clutch 35.

The beaters 20 and 21 have unsupported ends and the straps of the beaters are riveted together as shown at 48. Caps 49 are riveted to heads 50 at the ends of the shafts 19 and 22. The end portions of the beater straps are clamped between the caps 49 and the heads 50.

In the use of the present beater, a slow speed is obtained by moving the clutch 35 into engagement with the crown gear 33 on the upper gear 28.

When a faster beating action is desired, the clutch member 35 is moved down until the crown gear 37 thereof meshes with the crown gear 34 of the lower gear 32. When one of the gears 28, 32 is engaged by the clutch 35, the other gear merely idles, for the clutch 35 is the only member that is keyed to rotate at the speed of the shaft 19.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications which may fall within the scope of the appended claim.

Having thus described my invention, what I claim and desire to secure by Letters Patent is:

In a household beater, a crank, a shaft having a portion non-circular in cross section, the end of said portion providing a shoulder, idler gears freely rotatable on the shaft at either side of said portion, one gear being rotatably supported by said shoulder, means rotatably supporting the other idler gear on the shaft, mechanism driven by the crank and in turn rotating the idler gears at different peripheral speeds, and means to selectively connect the shaft with one idler gear or the other.

FRANK O. HOLISTER.